3,347,956
GRAFT BLENDS AND METHOD OF PREPARING SAME
Leo E. Rademacher, Springfield, Mass., assignor to Monsanto Company, St. Louis, Mo., a corporation of Delaware
No Drawing. Filed Aug. 27, 1964, Ser. No. 392,641
10 Claims. (Cl. 260—878)

ABSTRACT OF THE DISCLOSURE

There is disclosed a process for making graft blends wherein a polyolefin of the ethylene series is admixed with a vinyl halide monomer and heated to a temperature of about 75 to 125° C. The mixture is then cooled to a temperature substantially below 75° C. to form finely divided particles of the polyolefin and the vinyl halide monomer is polymerized in the presence of the polyolefin particles at a temperature substantially below 75° C. to form a graft copolymer. The preferred process utilizes polymerization in aqueous suspension.

---

This invention relates generally to vinyl halide polymers. More particularly, the invention relates to polyvinyl halide-polyolefin graft blends.

Unplasticized vinyl chloride polymers have found utility in the manufacture of rigid articles requiring good resistance to chemical degradation and heat distortion. These rigid articles are, however, often found deficient in certain physical properties, such as low temperature flexibility and impact resistance. This problem has not been completely resolved by the addition of plasticizers since toughness and many other desirable properties of the vinyl chloride polymers are reduced and occasionally destroyed. Certain polyolefins, such as those prepared by polymerizing members of the ethylene series (unsaturated hydrocarbons of the general formula $C_nH_{2n}$ which contain one double bond) are tough, pliable and have good chemical inertness and resistance to many solvents. Polyethylene is one of the better known members of this series.

Although it would appear that the combination of polyvinyl chloride with these polyolefins would be most advantageous, the problems associated with blending these components have greatly restricted any advances in this direction. For example, although mechanical mixing of polyvinyl chloride and polyethylene has been attempted, the resulting mixture has been found to be incompatible, tending to produce blends lacking in homogeneity. In addition, graft copolymers of polyethylene and polyvinyl chloride have been prepared by dissolving the polyethylene in various solvents before reaction (see, for example, U.S. Patent 2,947,719). The use of solvents is generally undesirable, however, since solvents tend to reduce grafting efficiency and impair the physical properties of the product. Attempts to avoid the use of solvents by the use of high temperatures have been partially successful, but these attempts have also tended to promote decomposition of the vinyl chloride during polymerization, as well as yielding polymers of very low molecular weight which possess generally poorer physical properties than those produced at 60° C. or below.

In accordance with the present invention, it has now been found that improved graft copolymer blends of polyvinyl halides and polyolefins of the ethylene series can be prepared at reasonably low reaction temperatures and without the use of solvents.

Accordingly, it is a principal object of this invention to provide vinyl halide-polyolefin graft copolymer compositions having improved physical properties.

It is another object of this invention to provide vinyl halide-polyolefin graft polymer compositions having improved physical properties that have been prepared at low reaction temperatures and without the use of solvents.

It is another object of this invention to provide methods and means by which to attain the preceding objects.

Other objects of this invention will be in part obvious and will in part appear hereinafter.

Each of the above objects has been realized through the development of a novel process wherein polyolefins of the ethylene series are first finely divided into minute particles by mixing the polyolefins with a vinyl halide monomer, and thereafter copolymerizing the finely divided polyolefin-vinyl halide monomer mixture to form a polyolefin-polyvinyl halide graft copolymer.

The finely divided polymers which are useful in the practice of this invention are those prepared by polymerization of an olefin of the ethylene series. The term "ethylene series" as used herein is intended to include unsaturated hydrocarbons with the general formula $C_nH_{2n}$ which contain one double bond. Optimum results are obtained when $n$ is between 2 and 8. More specifically, the term "ethylene series" is intended to include ethylene, propylene, butylene, amylene, hexylene, heptylene, octylene, and their isomers.

Polyethylene has been found to be the polyolefin most useful in the practice of this invention. Of the various grades of polyethylene available, those having melt indices in the range of about 0.1–40, preferably in the range of 0.4–25, and densities in the range of 0.91 to 0.93 grams per cc. have been found to produce the best results.

The term "vinyl halide" as used herein includes vinyl chloride, vinyl bromide, or vinyl fluoride, although vinyl chloride has been found to be the most useful of the vinyl halide monomers in the practice of this invention. Small amounts of other ethylenically unsaturated monomers may be present, if desired, such as for example, vinyl acetate, vinyl butyrate, styrene, methyl acrylate, butyl acrylate, allyl chloride, methallyl acetate, methyl vinyl ketone, alkyl vinyl ethers wherein the alkyl radical contains from 2 to 12 carbon atoms, and the like.

The following examples are presented to illustrate the novel features of this invention and are not to be construed as limiting the invention in any manner.

EXAMPLE I

A mixture of 100 parts of pelleted polyethylene having a melt index of 3 as measured by ASTM No. D1238–57T, and a density of 0.920 g./cc., together with 500 parts of vinyl chloride monomer is placed in a closed container capable of containing the mixture at pressures of about 300 p.s.i.g. The mixture is then heated at 95° C. for one hour while being continously agitated. The mixture is cooled to about 60° C. and added to a heated reaction vessel equipped with an agitator, together with 1200 parts by weight of water, 1.8 parts by weight of hydroxypropyl methyl cellulose having a gel point of 65° C. or higher, and 1 part by weight of lauroyl peroxide. The resulting mixture is agitated at about 55° C. for approximately 10 to 12 hours. After this period the unreacted monomer is vented off, and the resin is filtered and dried.

EXAMPLE II

The process of Example I is repeated except that 100 parts of pelleted polypropylene are used in place of the polyethylene of Example I.

EXAMPLE III

Example I is repeated except that an additional 300 parts of vinyl chloride monomer are added to the heated reaction vessel prior to copolymerization of the mixture.

EXAMPLE IV 100 parts of the resin obtained in Example I are intimately mixed with 100 parts of polyvinyl chloride (specific viscosity, 0.4% in cyclohexanone at 25° C., equals 0.380), 2.5 parts of dibutyl tin maleate and 0.5 parts of dibutyl tin dilauroyl mercaptan stabilizers on a mill roll at 165° C. A comparison of this milled sheet with one made by milling polyethylene with polyvinyl chloride in the same overall ratio shows clearly that the graft blend is more compatible and tougher.

EXAMPLE V

A mixture of 25 grams of pelleted polyethylene together with 400 grams of vinyl chloride monomer is placed in a closed container capable of containing the mixture at pressures of about 300 p.s.i.g. The mixture is heated to 100° C. for 45 minutes, during which time the mixture is continuously agitated. After cooling during 10 minutes to about 60° C., the mixture is placed in a heated agitated reaction vessel containing 0.9 gram of lauroyl peroxide, and 800 grams of water having 1.8 grams of methyl, hydroxypropyl cellulose dissolved therein. The resulting mixture is agitated at about 70° C. for approximately 7–8 hours. After this period the unreacted monomer is vented off and the resin is filtered and dried.

200 parts of the resin are mixed with 2.5 parts of dibutyl tin maleate and 0.5 parts of dibutyl dilauroyl mercaptan stabilizers on a mill roll at 175° C. Portions of the milled sheet taken at different intervals of time are molded into slabs ⅛ inch thick and cut into test specimens. A mixture of polyvinyl chloride homopolymer and polyethylene in equivalent portions are milled for purposes of comparison. ASTM test results are as follows:

TABLE I

| Tensile Properties | Graft Blend | Milled Blend |
| --- | --- | --- |
| Stress at yield, p.s.i. | 7,260 | 5,040 |
| Percent elongation at yield | 3.91 | 4.0 |
| Tensile Modulus, p.s.i.×$10^5$ | 4.00 | 2.61 |
| Stress at fail, p.s.i. | 6,410 | 4,890 |
| Percent elongation at fail | 35 | 15 |

EXAMPLE VI

A graft blend is prepared using the same procedure as set forth in Example I. 40 parts of polyvinyl chloride resin are physically admixed at 165° C. with 60 parts of the graft blend. The resulting composition after 15 minutes milling exhibits good physical properties.

EXAMPLE VII

Example I is repeated except that 50 parts of vinyl acetate are charged to the reaction vessel prior to polymerization of the mixture.

EXAMPLE VIII

A graft blend is prepared using the same procedure and ingredients as set forth in Example VII. To this blend, 70 parts of polyvinyl chloride resin (specific viscosity, 0.4% in cyclohexanone at 25° C., equals 0.380) per 30 parts of the graft blend are physically admixed at 165° C. The resulting composition after 15 minutes milling is a tough, strong, rigid material.

EXAMPLE IX

The graft blend is prepared using the same procedure and ingredients set forth in Example I. To this blend, 60 parts of polyvinylidene chloride resin (specific viscosity, 0.4% in cyclohexanone at 25° C., equals 0.40) per 40 parts of the graft blend are physically admixed at 170° C. The resulting composition after 15 minutes milling is a tough, strong, rigid material.

EXAMPLE X

A graft blend is prepared using the same procedure and ingredients as set forth in Example V. To this blend, 60 parts of a copolymer of vinyl chloride:vinyl acetate 85:15 resin (specific viscosity equals 0.30) are physically admixed with 40 parts of the graft blend at 160° C. The resulting compositions after 15 minutes milling is a tough, strong, rigid material.

EXAMPLE XI

A mixture of 100 parts of pelleted polyethylene having a melt index of 3 and a density of 0.920 g./cc. together with 500 parts of vinyl chloride monomer is placed in a closed container capable of containing the mixture at pressures of about 300 p.s.i.g. The mixture is then heated at 95° C. for one hour, cooled to about 60° C. and added to a heated reaction vessel equipped with an agitator, together with 400 parts by weight of water. 390 parts of vinyl chloride monomer are then distilled off, leaving a polyethylene:vinyl chloride mixture present in ratios of about 100 parts of polyethylene to 110 parts of vinyl halide monomer. 0.6 parts by weight of hydroxypropyl methyl cellulose having a gel point of 65° C. or higher and 0.22 parts by weight of lauroyl peroxide are then added. The resulting mixture is agitated at about 55° C. for approximately 10–12 hours. After this period the unreacted monomer is vented off and the resin is filtered and dried.

The ultimate fineness and quality of the powdered polyolefin present within the polyolefin:vinyl halide monomer mixture prior to copolymerization will depend upon the initial ratio of polyolefin to vinyl halide monomer, the temperature to which the mixture is heated, the degree of agitation, and to some extent the particular grade of polyolefin employed. Generally it has been found that polyolefin:vinyl halide monomer ratios of between 1:2 to 1:20, with optimum ratios ranging between 1:5 and 1:7 are the most suitable for the practice of this invention. However, by employing a secondary immiscible liquid such as water to aid in suspending the solid materials ratios of 1:1 and perhaps even higher ratios of polyolefin to vinyl halide monomer may be used. Powdering temperatures generally range between 75° C. and 125° C. For polyethylene, powdering temperatures of between 80° C. and 115° C. are most suitable. Low molecular weight, low density polyolefins generally require temperatures in the range of 80–90° C., while high density and/or high molecular weight polyolefins generally require temperatures of 100° C. or higher. For best results the mixture should be maintained at these temperatures for about 30 to 60 minutes. It has also been found to be particularly advantageous to agitate the mixture during heating, although the degree of agitation necessary to obtain optimum results will depend upon the particular conditions and proportions present within the ranges outlined above. Cooling rate of the mixture has also been found to be an important factor since, generally, faster cooling tends to produce less agglomeration of the fine particles. Cooling times of 10 minutes or less are preferred in this regard.

The quantity of finely divided polyolefin present in the polyolefin-vinyl halide mixture prior to polymerization may range between 5–75%, with 5–55% being the more preferred range. The particular ratio of polyolefin to vinyl halide monomer may be adjusted prior to polymerization by the addition of vinyl halide monomer to give lower polyolefin:vinyl halide ratios, or by removal of vinyl halide to give higher polyolefin:vinyl halide ratios.

The uniform particle size of the finely divided polyolefins is an obvious advantage in graft polymerization techniques. The particles, generally in the shape of spheres, will have ultimate particle sizes in the range of 10–200 microns and, at optimum process conditions, will have average particle sizes in the range of 10–50 microns. In contrast, polyolefin powders prepared by prior art methods, and which are presently used in graft polymerization show large differences in particle sizes and geometry. For example, mechanically ground polyolefins are generally composed of large irregularly shaped solid particles having relatively small amounts of surface area. In addition, mechanically ground polyolefins yield poorer grafting efficiency and, accordingly, poorer compatibility. Some prior art methods produce bulky agglomerates of very small particles or large particles having small amounts of surface area and are often quite costly. Other prior art powdering methods produce undesirable impurities. For example, the manufacture of finely divided polyethylene by emulsion polymerization introduces impurities, in the form of emulsifiers, surface active agents, etc., resulting in a product having poorer water resistance and physical strength. It can be readily appreciated, therefore, that this invention presents numerous advantages in the manufacture of graft copolymers of polyolefins with polyvinyl halides.

As illustrated in Example VII, vinyl acetate or other ethylenically unsaturated monomers such as, for example, vinyl formate, vinyl acetate, vinyl propionate, vinyl butyrate, vinylidene chloride, styrene, methyl acrylate, ethyl acrylate, butyl acrylate, methyl methacrylate, ethyl ethacrylate, allyl acetate, allyl chloride, allyl formate, vinyl chloroacetate, allyl trichloroacetate, methallyl acetate, chlorostyrene, dichlorostyrene, acrolein, acrylonitrile, methacrylonitrile, methacrolein, methacrylic acid, methyl vinyl ketone, methyl isopropenyl ketone, alkyl vinyl ethers, methyl allyl ether, and the like may be charged in minor amounts, i.e., up to 30% by weight of the mixture, to the reaction vessel with the mixture.

The vinyl chloride, vinyl acetate, or any of the other ethylenically unsaturated monomers mentioned previously which are to be copolymerized wtih the polyolefin-vinyl halide mixture may be added initially with the mixture, added later during polymerization, or slowly bled into the system during polymerization. Additionally, part of the monomers may be withheld initially and charged as polymerization progresses. Satisfactory results are obtainable both in batch and continuous operations. The reaction products are isolated by conventional means, the details of which depend upon the particular polymerization technique employed.

The graft blends formed in the practice of this invention can be physically blended with other polymer compositions which are normally incompatible with polyolefins of the type described. A preferred composition for the formation of high or medium impact strength rigid materials that can be extruded or calendered at relatively high rates are those wherein the graft blend formed in the practice of this invention is physically admixed with polyvinyl chloride homopolymer with possible adjuncts of up to 20% by weight of other compatible polymers to give final compositions containing 3-12% total polyolefin, grafted and ungrafted. The optimum ratio of the graft material to be blended with the polyvinyl chloride homopolymer will depend to a large extent on the amount of polyolefin present in the graft blend. The higher the polyolefin content, the softer will be the final composition. Normally, those compositions wherein the total polyolefin content, grafted and ungrafted, is in the range of 3-12% will be tough, strong, rigid materials suitable for such applications as pipe, rigid extruded profiles, injection molded rigid objects, calendered rigid sheets, etc. On the other hand, blends containing higher percentages of polyolefins, grafted and ungrafted, particularly in the range of 30-50% polyolefin content, are advantageous for such applications as non-migrating semi-rigid or flexible films, and extruded or molded semi-rigid or flexible articles of manufacture. Table II indicates compositional results obtainable in the graft blend by varying the ratio of polyolefin, e.g., polyethylene to polyvinyl chloride homopolymer. These results were obtained by Soxhlet extraction of the graft blend with tetrahydrofuran-water azeotrope (4.3% water) which will selectively dissolve polyvinyl chloride homopolymer, as previously described, followed by extraction with cyclohexane, a good solvent for polyethylene but not for the graft portion.

TABLE II

| Starting Materials | Composition of Graft Blend | |
|---|---|---|
| Ratio of Polyethylene: Vinyl Chloride | Percent Polyethylene | Percent Graft and PVC |
| 30:75 | 14.1 | 85.9 |
| 50:55 | 23.5 | 76.5 |

The following table illustrates the effect of molecular weight of polyethylene on grafting efficiency. As can be readily seen from an inspection of Table III at the lower melt indices, i.e., between 0.4 to 3.0, higher grafting efficiencies are obtained.

TABLE III

| Starting Material | Percent Polyethylene (Grafted and Ungrafted Polymer) | Percent Ungrafted Polyethylene |
|---|---|---|
| Polyethylene (Density=.92 g./cc.; MI =0.4) | 30 | 12.9 |
| Polyethylene (Density=.92 g./cc.; MI =3.0) | 30 | 14.1 |
| Polyethylene (Density=.92 g./cc.; MI =7.0) | 30 | 15.6 |
| Polyethylene (Density=.92 g./cc.; MI =22.0) | 30 | 16.2 |

The properties of these graft copolymers differ from the properties of a physical blend of polyvinyl chloride with polyethylene, particularly in regard to rigidity, clarity, tensile strength, solvent resistance, heat distortion point, and chemical resistance. One of the primary distinctions between the graft copolymers of this invention and other graft copolymers is that they tend to compatibilize the useful components in multicomponent blends.

The conditions present during graft copolymerization are conventional. Temperatures may range between 35–75° C. until the polymerization is substantially complete. The amount of water, suspending agents and catalysts may vary over those ranges generally associated with suspension polymerization systems.

The polymerization may be accelerated by heat, irradiation and polymerization catalysts. Catalysts which have been found to be useful are the monomer soluble organic peroxides, e.g., benzoyl peroxide, lauroyl peroxide, 2,4-dichlorobenzoyl peroxide, acetyl benzoyl peroxide, t-butyl peroxypivalate, acetyl cyclohexyl sulfonyl peroxide, or other unsymmetrical peroxides, alkyl percarbonates such as isopropyl peroxycarbonate, perborates, azo compounds such as azo-bis (isobutyronitrile), and mixtures of the same. The quantity of catalyst will generally be varied depending upon initiator activity, and on the quantity of monomer and diluent, if any. Polymerization aids such as molecular weight modifiers, solvents, suspending agents, particle porosity modifiers, non-inhibiting heat stabilizers, emulsifiers, buffers, catalyst activators such as reducing agents, non-interfering plasticizers, fillers, pigments, etc., may also be advantageously employed in this regard.

The products of this invention are rigid or semi-rigid blends which are useful in preparing rigid and semi-rigid sheets, tubes and molded objects having an optimum balance of high impact and tensile strengths. They are also characterized by good flow properties at relatively low processing temperatures, high heat distortion point and excellent chemical and solvent resistance. These latter properties, as well as their high resistance to ultraviolet radiation, make the products of this invention excellent for many outdoor applications such as corrugated and flat roofing, siding, etc. Examination of samples of the compositions withdrawn from a roll mill after milling times of 5, 10 and 25 minutes shows that they can withstand relatively long milling times without undergoing thermal degradation, i.e., discoloration. They may be calendered, injection molded, extruded, or otherwise fabricated to form rigid sheets, pipes, structural pieces, wire coatings, etc. When desirable, they can be reinforced, e.g., with asbestos fibers.

It is obvious that many variations may be made in the products and processes set forth above without departing from the spirit and scope of this invention.

What is claimed is:

1. A process for the preparation of polyolefinvinyl halide graft copolymers which comprises contacting a polyolefin of the ethylene series with a vinyl halide monomer, heating the resultant mixture to a temperature between about 75 to 125° C. in the absence of an initiator, cooling the mixture to a temperature substantially below 75° C. to produce finely divided particles of said polyolefin, and thereafter polymerizing the vinyl halide monomer in the presence of an initiator and said polyolefin particles at a temperature substantially below 75° C. to form a graft copolymer.

2. A process according to claim 1 wherein said polyolefin is polyethylene having a density of between 0.91–0.93 g./cc. and a molecular weight of between 25,000 and 500,000.

3. A process according to claim 1 wherein said vinyl halide is vinyl chloride.

4. A process according to claim 2 wherein said polyethylene-vinyl halide mixture is heated to a temperature of between 80° C. and 115° C. prior to polymerization.

5. A process according to claim 2 wherein the polyethylene particles have an average size of between 10–50 microns after cooling and prior to polymerization.

6. A process for preparation of polyolefin-vinyl halide graft copolymers which comprises contacting a polyolefin of the ethylene series with a vinyl halide monomer; said polyolefin and said vinyl halide monomer being present in ratios of between 1:2 and 1:20, respectively, heating the resultant mixture to a temperature between about 75 to 125° C. in the absence of an initiator, cooling the mixture to a temperature substantially below 75° C. to produce finely divided particles of said polyolefin, and thereafter polymerizing the polyolefin-vinyl halide mixture in the presence of water, a suspending agent and an initiator at a temperature substantially below 75° C.

7. A process according to claim 6 including the steps of adding additional vinyl halide monomer to the cooled mixture prior to polymerization.

8. A process according to claim 1 wherein sufficient vinyl halide monomer is removed from the mixture prior to polymerization to leave a polyolefin:vinyl halide mixture present in ratios of about 100 parts of polyolefin to 110 parts of vinyl halide monomer.

9. A process according to claim 6, wherein the vinyl halide monomer contains a minor amount of at least one other monomeric material which is copolymerizable therewith.

10. A process according to claim 6, including the step of adding vinyl acetate monomer to said vinyl halide-polyolefin mixture prior to polymerization.

References Cited

UNITED STATES PATENTS 2,804,443   8/1957   Fordham _____ 260—877

FOREIGN PATENTS 783,790   10/1957   Great Britain.

MURRAY TILLMAN, Primary Examiner.

D. J. BREZNER, Assistant Examiner.